April 13, 1954     W. A. MEIGHAN ET AL     2,675,265
ANCHOR FOR LOAD-BRACING STRAPS Filed June 6, 1950     2 Sheets-Sheet 1

INVENTORS
William A. Meighan
and Tirey L. Hume

UNITED STATES PATENT OFFICE 2,675,265

ANCHOR FOR LOAD-BRACING STRAPS

William A. Meighan and Tirey L. Hume, Oswego, Oreg.

Application June 6, 1950, Serial No. 166,495

5 Claims. (Cl. 105—369)

This invention relates to a ship clamp which is adapted to grip the web and inboard flange of a ship hull rib so that cables or straps can be secured thereto and stretched across the ship hold or attached to pieces of cargo to inhibit cargo shift.

One object of our invention is to provide a two-piece ship clamp which requires a minimum application of force to effect an initial grip on the hull rib so that a workman may fix the clamp in place while he swings precariously from a sling or stands upon other insecure support.

All ocean-going cargo vessels must be protected against the ever present danger that the cargo being transported may shift about and cause the vessel to list. This danger, if allowed to materialize during a storm or the running of a high sea, may cause the cargo to slide or shift about in the hold and change the ship's center of gravity as the ship pitches or rolls from side to side. In extreme cases, a cargo of fungible goods has been known to flow to one side causing the ship to list or heel dangerously. With non-fungible or concentrated pieces of cargo, such as heavy machinery, damage is produced when the machinery breaks loose and slides about in the hold. The conventional provisions against such cargo shift vary with the cargo type. Thus, with heavy machinery or other concentrated pieces of cargo, heavy cables or metal straps are secured between the individual pieces of cargo and the hull ribs or deck cleats. With a fungible cargo, however, the hold is conventionally divided into two or more smaller interconnected compartments by forming a temporary fore-and-aft bulkhead or baffle network across the hold with spaced timbers or planks. The fungible cargo is then loaded by being discharged over this temporary structure so that timbers divide the fungible mass and serve as baffles to inhibit lateral movement thereof.

Before the price of timber rose to its present high level, temporary bulkheads or baffles were secured in place with transverse timber "shoring" members. Recently, however, this timber "shoring" has been eliminated by securing the vertical baffle plates to the ship ribs with metal straps or cables. Whatever type of cargo is to be secured against shifting, it will be noted that some means must be provided to secure the metal straps or cables to the ship hull ribs. That is so say, a ship clamp is required which will engage the flange and web of a hull rib and secure a metal strap or cable in place whether the metal strap or cable is holding a concentrated piece of cargo or is holding a fungible cargo baffle plate. It is toward an improvement in this type of ship clamp which our invention is directed.

The ribs of a ship are elongate vertical members, usually Z-bars, channels, or bulb bars, to which the skin of the ship is welded or riveted. In any event, as viewed from the inside of the hold, a typical rib is formed with an outboard flange secured to the skin, a web arranged to lie perpendicular to the plane of the skin, and an inboard flange spaced from and parallel to the skin. The typical ship clamp overlies the inboard flange and a portion of the web and is secured thereto with a wedge, set screw, or pair of jaws. A hook or eye usually protrudes from the end of the clamp in order that a strap or cable may be secured thereto. One disadvantage which we have found to exist in the conventional ship clamp resides in the means provided to secure the clamp to the hull rib. Thus, the hold of a ship may be quite deep and, in lining the hold or constructing the temporary timber baffles, a workman must be supported by temporary staging, suspended from a sling, or otherwise insecurely positioned adjacent the hull ribs to work thereon. In such a precarious position, it is difficult to thread a heavy screw and cinch it tight, strike a heavy hammer blow or exert a large leverage with a prybar. Therefore, the conventional ship clamp, with its associated set screw or wedge and inherent heavy construction, is difficult to secure in place. Furthermore, the distance between the ship skin and inboard rib flange is often nine inches or less. Such a restricted distance limits the amount of force which can be generated to secure the ship clamp in place with a blow from a maul. Accordingly, one object of our invention is to provide a ship clamp which is secured in place on a hull rib in two separate operations the first of which easily can be accomplished by a workman confined to a small work area while suspended from a sling. The first step practiced to secure our clamp involves a mere tacking operation so the clamp will not slide down the vertical rib. Thus, a workman need not attempt to thread a heavy set screw or drive a maul while supported precariously. The second step follows automatically after the workman has been hauled to safety. When a cable or strap is placed in the hook or eye of the clamp and tensioned, as with a "come-along," the tension increases the grip of our ship clamp on the rib and securely fastens the same in place.

One object of our invention is to provide a two piece ship clamp for gripping the web and inboard flange of a hull rib, which clamp, is provided with a tunnel in the terminal end thereof for increasing the grip of the clamp on the rib when a pull is applied to the tunnel.

Another object of our invention is to provide a ship clamp with a novel uneven weight distribution about the pivotal axis thereof whereby a gravity bias will pivot the clamp about said axis to effect an initial grip upon a hull rib.

A further object of our invention is to so proportion the two members of a ship clamp that an increased mechanical leverage may be obtained by applying the conventional pulling force of a cable or strap to one of the pieces.

Yet another object of our invention is to provide a ship clamp with an elongate tapered keeper member which slides in a tapered tunnel in the clamp to increase the grip of the clamp on the ship rib in direct proportion to the amount of pull applied to the keeper member.

These and other objects and advantages of our invention will appear in the following detailed description taken in connection with the accompanying drawings, in which.

Figure 1:
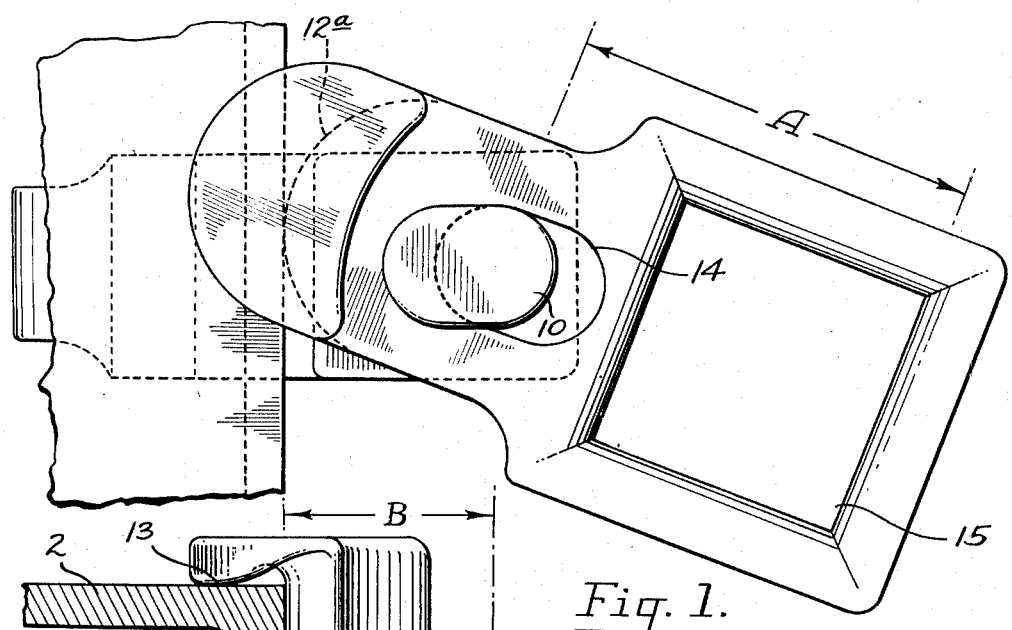
Fig. 1 is a front elevation of one species of our invention showing a square tunnel means in the terminal end thereof for threading a wire strap therethrough.

Each species of our invention is adapted to grip a ship hull rib having an inboard flange 1 and a web 2. In the species shown in Figs. 1 and 2, a U-shaped body is provided with a first or outboard leg 3 and a second or inboard leg 4 joined by a connecting section 5. The clamp as shown is approximately full scale and is best cast or formed from metal. If desired, the body portion may be reinforced and strengthened by a closed arch peripheral rib 6. The outboard leg 3 is somewhat longer than the inboard leg and lies adjacent the outboard side of the flange 1 in contact therewith at two spaced flange contact faces 7. The terminal end of this leg 3 is pointed to form a web contact line or face 8 and is rounded at 9 to clear the rib fillet. In this species of our invention, the connecting section 5 is rounded and is spaced somewhat from the end of the flange 1 so as to accommodate various flange dimensions without bearing thereon.

Figure 2:
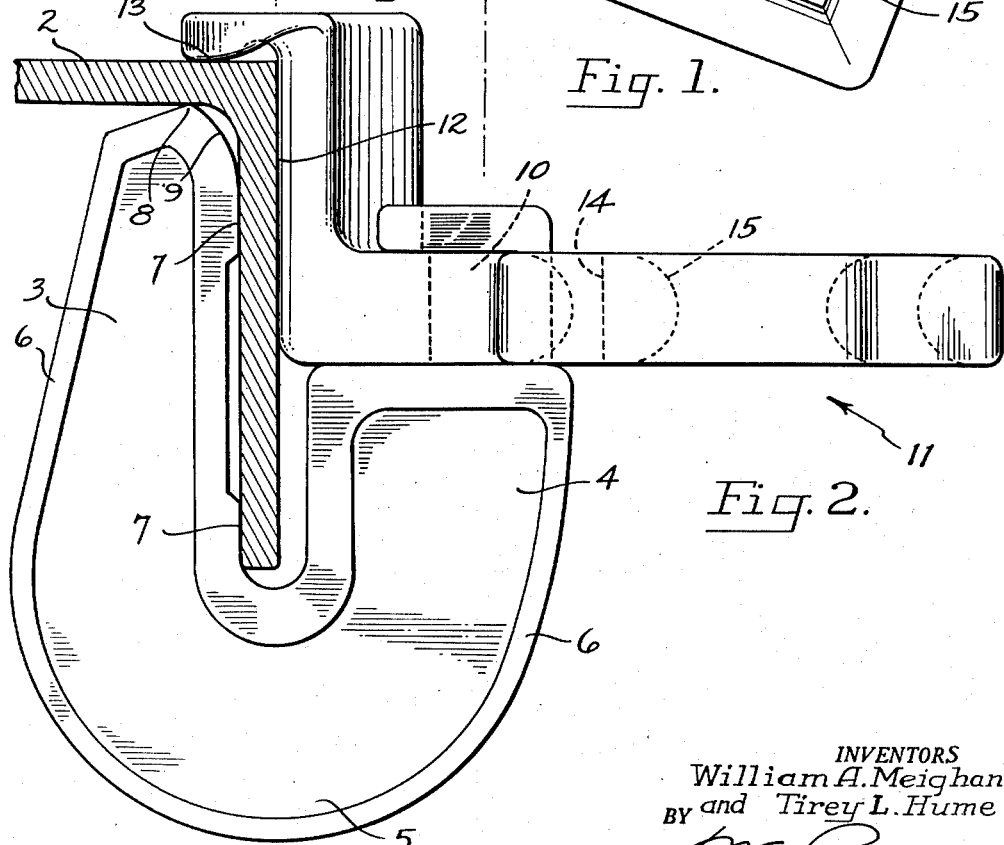
Fig. 2 is a top view of the species shown in Fig. 1, partially in section, showing our ship clamp in position on a hull rib as it would appear to a person looking into the hold from the deck.

The inboard leg 4 terminates in a flanged carrying portion or bearing rod 10, the axis of which is spaced laterally from the axis of the leg 4. An elongate keeper member 11, carrying a flange jaw 12 and a web jaw 13, is journaled on the bearing rod 10 for rotation relative to the U-shaped clamp body. The keeper pivot or bearing surface 14, which accommodates the bearing rod 10, is made somewhat larger than the flange on the bearing rod so the two pieces of the ship clamp can be separately formed and assembled thereafter. In the inboard or first terminal end of the elongate keeper member 11, we have shown a square strap receiving opening 15 through which a metal strap may be threaded. However, the particular opening shown in Figs. 1 and 2 is only shown by way of example and, within the scope of our invention, either the hooked means 15a of Fig. 3 or the closed eye means 15b of Fig. 4 may be substituted therefore as desired. Thus, we employ the term "strap receiving opening" as generic to the square 15, the hook 15a and the eye 15b. In any event, if the square opening is employed to secure a metal strap to the cargo or baffle timbers, the strap is best tensioned with either our Tensioning and Joining Devise for Strap Ends disclosed in our Patent No. 2,611,164, September 23, 1952, or our Flange Tensioning and Joining Device for Strap Ends, disclosed in our Patent No. 2,642,639, June 23, 1953.

As best shown in Fig. 1, the outboard or second terminal end of the keeper 11 is provided with the flange jaw 12 which, in turn, carries an arcuate cam face 12a the high point of which is spaced, in operative position, from the flange contact face 7 less than the thickness of the hull rib. The web jaw 13 is formed with a similar arcuate cam face spaced a similar distance from the web contact face 8. Thus, both jaw members 12 and 13, in cooperation with the contact faces 7 and 8, bite into the flange and web of the rib a similar distance as the keeper member 11 is rotated on the bearing rod 10. Furthermore, if the square securing opening 15 is employed, a mechanical advantage may be realized by spacing the inboard side of the opening further from the axis of the bearing rod 10 than is the cam face 12a. That is to say, if the distance A exceeds the distance B, an increased mechanical leverage is realized when a force is applied to the outboard side of the square opening 15 as with a strap and tensioning device.

In the operation of the species shown in Figs. 1 and 2, a minimum of force is required to effect an initial grip on the hull rib since both the jaw members 12 and 13 are spaced from the cooperating contact faces 7 and 8 by a distance less than the thickness of the hull rib. Thus, a workman suspended from a sling or supported upon a scaffolding, merely slips the U-shaped body over the inboard flange board 1 and rotates the keeper member 11 slightly. This rotation causes the arcuate cam faces on the web jaw 13 to pull or draw the leg 3 toward the rib web 2 to effect a grip thereon. At the same time, it causes the cam face 12a on the flange jaw to draw the flange contact faces 7 into abutment against the flange 1. Furthermore, if the distance A exceeds the distance B, the workman is aided by an increased mechanical leverage. Thus, a dual biting action is effected upon the hull rib, yet a minimum force need be applied to fix the clamp in place. Where desired, we have made provision for a gravity bias on our jaw members 12 and 13 whereby the keeper member 11 is pivoted into an initial grip upon the hull rib with even less force being applied thereto. This gravity bias is created by distributing the weight of the keeper member 11 in an uneven manner about the axis of the bearing rod 10 as a pivot point. That is to say, if the ship clamp is to be applied as shown in Fig. 1 (with a counter-clockwise rotation), the mass of the keeper member 11 to the left of the bearing rod 10 is made to exceed substantially the mass of the keeper member 11 located to the right of the bearing rod 10 in order that the left end will be gravity biased to pivot into an initial gripping position. On the other hand, if the grip of the jaw members is to be effected by swinging the jaw members up from the bottom (by rotating the keeper member in a clockwise direction), the mass of the keeper member to the right of the bearing rod 10 is made to exceed substantially the mass to the left of the bearing rod. This latter construction will cause the right end of the keeper member 11 to be gravity biased for rotation in a clockwise direction and, once again, the keeper member will tend to rotate into an initial grip with the hull rib. In any event, it should be noted that the operative position of our Figs. 1 and 2 species is effected with the keeper member at a small angle to the perpendicular as defined by the plane of the inboard flange 1.

Figure 3:
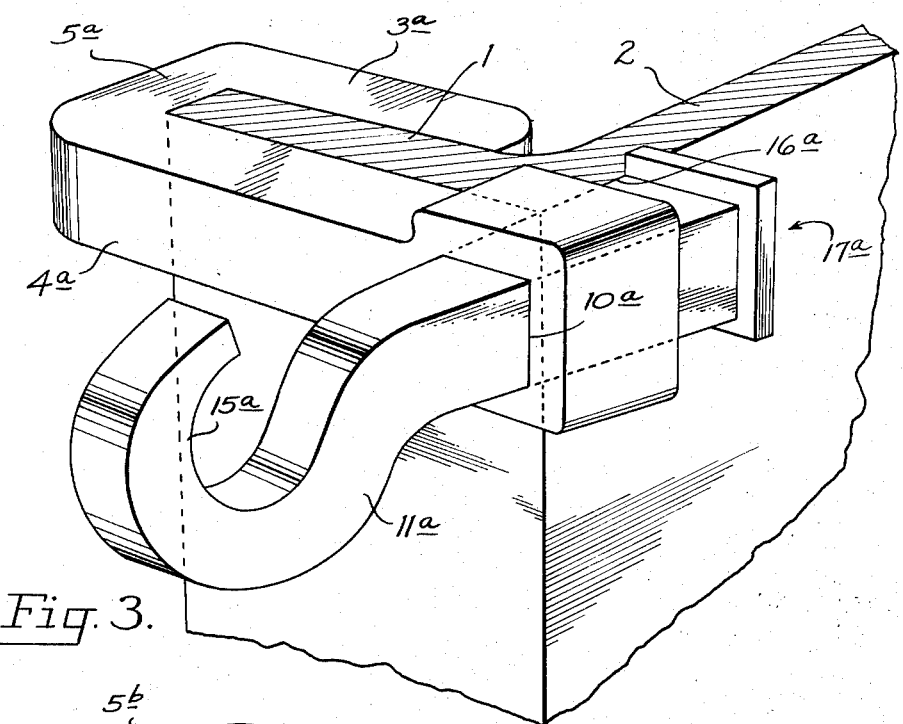
Fig. 3 is a perspective view, with a hull rib shown in section, showing a second species of our ship clamp in which a tapered keeper member terminates in a hook.
Figure 4:
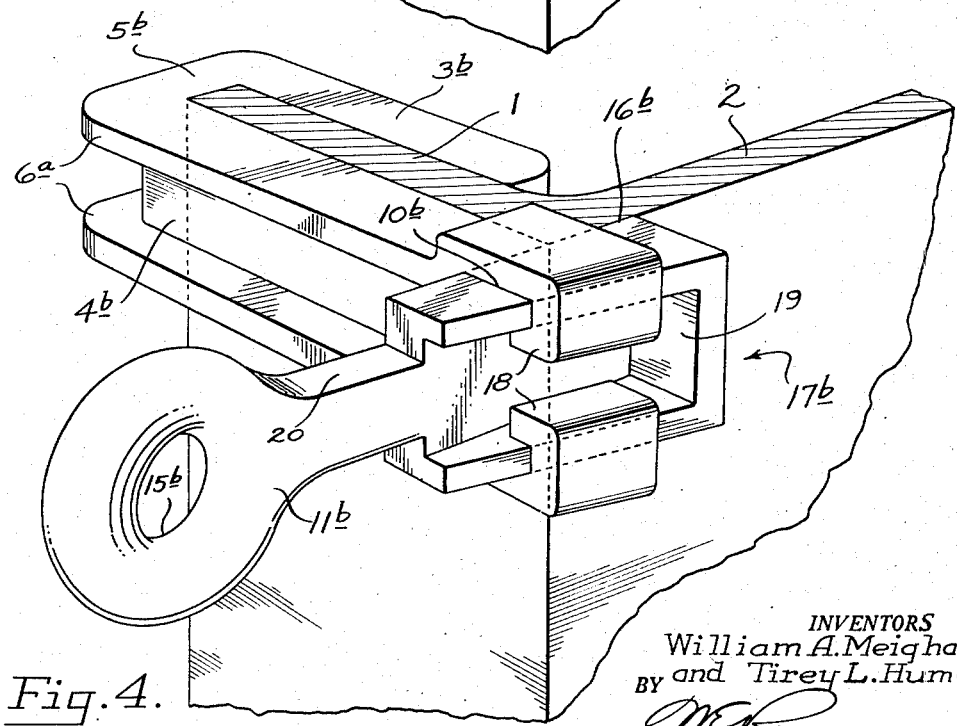
Fig. 4 is a perspective view similar to Fig. 3 but showing a third species of our ship clamp in which a tapered keeper member terminates in a closed eye.

The two species of our ship clamp shown in Figs. 3 and 4 include similar U-shaped bodies having respective outboard or short legs 3a, 3b, inboard or long legs 4a, 4b, and connecting sections 5a, 5b. Each of the mated legs 3a, 4a, and 3b, 4b are substantially parallel with and are spaced from one another the approximate thickness of the rib flange 1 to encompass closely the same with the respective connecting sections 5a and 5b gripping the ends of the flange 1. If desired, each of these ship clamps may be strengthened by twin peripheral ribs 6a as shown in Fig. 4. The inboard or long legs 4a, 4b terminate in tapered tunnels or carrying portions 10a, 10b, respectively. These tunnels 10a and 10b are similar to the carrying portion 10 of the first species of our invention in that they operatively carry elongate keeper members 11a and 11b, respectively, which are similar in function to the elongate keeper member 11 of Figs. 1 and 2. Thus, as we define the term, "carrying portion" is generic to the bearing rod 10, and to the tunnels 10a and 10b.

In the species of Fig. 3, the tunnel 10a is longitudinally tapered to accommodate the tapered keeper 11a and the axis of the tunnel lies substantially perpendicular to the plane of the flange 1. Furthermore, the inner side of the tapered tunnel 10a lies substantially in the plane of the web 2 in order that the inner face or jaw 16 on the keeper member 11a may grip and obtain purchase from the web 2. The rear face of the keeper member 11a is squared or flanged somewhat in order to provide a rear tool engaging face 17a adapted to coact with a hammer or pry bar if such is desired. Thus, in the operation of this species of our invention, the U-shaped body 3a, 5a, 4a is placed in position encompassing the flange 1 of the rib. Thereafter, the tapered keeper member 11a is inserted through the tapered tunnel 10a by threading the hook 15a through the tunnel and, thereafter, either a pull is applied to the hook 15a or, if required, the rear tool engaging face 17a is tapped lightly with a hammer or is moved with a pry bar. As the keeper member 11a is driven into the tunnel 10a, the jaw 16a grips the rib 2 and applies purchase to the leg 4a to draw the connecting section 5a against the end of the flange 1 in a secure manner. The ship clamp is thereby tacked or fixed in place. If the hook 15a or eye 15b is then employed, a cable or rope is threaded therethrough. If the square opening 15 is employed, a flat metal strap is threaded therethrough. In any event, as tension is applied to the cable, rope, or strap, the keeper member 11a more tightly engages the tapered faces of the tunnel 10a and the jaw 16a increases the grip of the connecting section 5a on the flange 1. Thus, it will be seen that no matter which species of our invention is employed, the workman easily may tack or fix the same in place while he is suspended from a precarious position.

The species of Fig. 4 differs but slightly from the species of Fig. 3. The main difference is manifest in the construction of the opening 10b and keeper member 11b. Thus, in this species, one side of the tapered opening 10b is slotted as defined by the twin flanges 18 and the keeper member 11b is recessed, as at 19, in a corresponding manner. The keeper member 11b is further recessed at 20, along the shank thereof, to provide a reduced portion which may be inserted through the slotted side of the opening 10b between the twin flanges 18. Thus, in the operation of this ship clamp, the U-shaped body 3b, 5b, 4b is placed in position about the flange 1 with the keeper member 11b kept separate. Thereafter, the keeper member 11b is arranged in position by inserting the recessed shank 20 through the slot between the flanges 18 and the keeper member is rotated 90° and moved into place with the jaw 16b contacting the web 2. As with the species of Fig. 3, the eye 15b is then pulled or the rear tool-engaging face 17b is then tapped by a tool or pried. This causes the jaw 16b to grip the web 2 and apply purchase to the leg 4b to draw the connecting section 5b against the end of the flange 1. If, thereafter, a cable, rope, or metal strap is tensioned to draw on the terminal end of the keeper member 11b, the grip of the connecting section 5b and the jaw 16b on the hull rib is increased.

Our invention is of particular utility when employed to secure metal straps or cables to the ribs of a cargo vessel in that the novel features thereof allow a workman to tack or fix the ship clamp in position while the worker is suspended from a sling or other insecure support. Thus, in accord with the objects of our invention, we have provided a two-piece ship clamp which grips the web and flange of a hull rib and which is provided with an opening means for increasing the grip of the clamp on the rib web when a force is applied perpendicular to the plane of the rib flange. We have further provided a ship clamp with an elongate tapered keeper member which coacts with a tapered opening to grip the web of a hull rib and obtain purchase therefrom to draw the clamp against the rib flange. As an optional feature of our invention, we have shown how an uneven weight distribution may be incorporated in our keeper member to form a gravity bias thereon tending to pivot the clamp into an initial grip upon the rib. We have also shown one manner in which the tunnel and jaw member of a ship clamp may be spaced differing distances from the axis about which they rotate to realize an increased mechanical leverage. Each of these advantages and objects is cumulative in providing a ship clamp which requires a minimum application of force to effect an initial grip on a cargo hull rib.

We claim:

1. A two piece ship clamp having an off center weight distribution for effecting an initial grip on the flange of a ship hull rib, comprising a U-shaped clamp body having a first and a second leg joined by a connecting section, one surface of said first leg defining a fixed jaw member, said second leg terminating in a bearing rod spaced from but substantially parallel to said second leg axis, and an elongate keeper member journaled on said bearing rod and having one surface disposed opposite said fixed jaw member to define a mated movable jaw member, means for securing said keeper with a flexible load bracing member, said elongate keeper member having an uneven weight distribution about said bearing rod axis as a pivot whereby said movable jaw member is gravity biased to pivot toward said fixed jaw member to effect an initial gripping relationship.

2. A two-piece clamp adapted to grip both the web and the flange portion of an L-shaped structural member, said clamp comprising; a first integral piece defined by a U-shaped body member having parallel first and second elongate leg portions joined by a connecting section, said second leg terminating in an integral, fixed carrying portion, a second integral piece defined by an elongate keeper member detachably carried by and movable relative to said carrying portion, said keeper member extending substantially perpendicular to the longitudinal axis of said second leg in all operative positions of the clamp and terminating in first and second terminal ends, respectively, said first terminal end being spaced laterally out from said second leg and carrying an integral fastening means for threadable engagement with a securing device, said second terminal end being arranged in intersecting alignment with an extension of the longitudinal axis of said first leg portion and carrying an integral tapered jaw means for slidable constricting contact with said web portion, said jaw means being operatively tapered relative to said web portion for cam-like sliding contact therewith to apply a purchase to said clamp through said second leg and draw said U-shaped body toward said jaw means and web.

3. A two piece clamp for gripping the flange portion of a structural member, comprising a U-shaped body having a first and a second elongate leg joined by a connecting section, one side of said first leg defining a flange contact face, said second leg terminating at its unjoined end in a bearing rod, an elongate keeper journaled for rotation upon said bearing rod and carrying a flange jaw disposed opposite to but spaced from said flange contact face to cooperate therewith in gripping relationship, said flange jaw having a cam face with the distance between the cam high point and the mated contact face less than the thickness of said structural member, and means for securing said keeper with a flexible load bracing member, whereby said jaw will effect an initial grip on said structural member when said keeper is rotated on said bearing rod.

4. A two piece clamp for gripping both the web and the flange portions of a structural member having a web and flange substantially perpendicular to one another, said clamp comprising a U-shaped body having a first and a second leg joined by a connecting end section, said first leg carrying a web contact face on the terminal end thereof and a flange contact face on one side thereof, said second leg terminating at its unjoined end in an integral elongate bearing rod, an elongate keeper detachably journaled on said bearing rod and carrying a flange jaw disposed opposite to said flange contact face to cooperate therewith in gripping relationship, said keeper terminating in a pendent web jaw disposed opposite said web contact face to cooperate therewith in gripping relationship, said flange jaw and web jaw having cam faces with the distance between the cam high points and the mated contact faces less than the thickness of said structural member, and means for securing said keeper with a flexible load bracing member.

5. A two piece clamp having an off center weight distribution for effecting an initial grip on the flange of a structural member, said clamp comprising a U-shaped clamp body having a first and a second leg joined by a connecting section, one surface of said first leg defining a fixed jaw member, said second leg terminating in a bearing rod spaced from but substantially parallel to the longitudinal axis of said second leg, an elongate keeper member journaled on said bearing rod and having one surface disposed opposite but substantially parallel to said fixed jaw member to define a mated gripping jaw member, means for securing said keeper with a flexible load bracing member, said elongate keeper member having an uneven weight distribution about said bearing rod axis as a pivot to define a gravity bias for said clamp, the terminal end of said keeper member having a tunnel extending laterally therethrough, one side of said tunnel being spaced further from the axis of said bearing rod than is said movable jaw member, whereby an increased mechanical leverage may be realized by applying a force thereto.

References Cited in the file of this patent

UNITED STATES PATENTS

| Number | Name | Date |
| --- | --- | --- |
| 2,324,361 | Chandler | July 13, 1943 |
| 2,359,146 | Odell | Sept. 26, 1944 |